(12) United States Patent
Li et al.

(10) Patent No.: US 8,594,048 B2
(45) Date of Patent: Nov. 26, 2013

(54) METHOD, BASE STATION AND RELAY STATION FOR SUPPORTING MOBILE STATION RANGING

(75) Inventors: Ting Li, Shenzhen (CN); Yanling Lu, Shenzhen (CN); Liangliang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 255 days.

(21) Appl. No.: 12/641,970

(22) Filed: Dec. 18, 2009

(65) Prior Publication Data

US 2010/0098029 A1 Apr. 22, 2010

Related U.S. Application Data

(63) Continuation of application No. PCT/CN2008/071268, filed on Jun. 11, 2008.

(30) Foreign Application Priority Data

Jun. 21, 2007 (CN) .......................... 2007 1 0112408

(51) Int. Cl.
*H04W 4/00* (2009.01)
*H04W 36/26* (2009.01)

(52) U.S. Cl.
CPC .............. *H04W 39/30* (2013.01); *H04W 36/26* (2013.01)
USPC .......................................... 370/332; 455/442

(58) Field of Classification Search
USPC .................... 370/332, 329, 331, 436; 455/442
See application file for complete search history.

(56) References Cited

U.S. PATENT DOCUMENTS

| | | | |
|---|---|---|---|
| 2005/0192011 A1* | 9/2005 | Hong et al. ................... | 455/440 |
| 2007/0076684 A1 | 4/2007 | Lee et al. | |
| 2007/0086387 A1* | 4/2007 | Kang et al. .................... | 370/331 |
| 2007/0264933 A1* | 11/2007 | Kang et al. ................... | 455/13.1 |
| 2008/0108355 A1* | 5/2008 | Oleszcsuk .................... | 455/442 |
| 2008/0125125 A1* | 5/2008 | Choi et al. .................... | 455/436 |
| 2009/0303918 A1* | 12/2009 | Ma et al. ....................... | 370/315 |

FOREIGN PATENT DOCUMENTS

| | | |
|---|---|---|
| CN | 1925357 A | 3/2007 |
| CN | 1929687 A | 3/2007 |
| CN | 101146337 A | 3/2008 |
| CN | 101175304 A | 5/2008 |
| KR | 20070035851 A | 4/2007 |
| WO | 2007/055544 A2 | 5/2007 |

OTHER PUBLICATIONS

Written Opinion of the International Searching Authority in corresponding PCT Application No. PCT/CN2008/071268 (Sep. 25, 2008).

(Continued)

*Primary Examiner* — Pao Sinkantarakorn
*Assistant Examiner* — Richard K Chang
(74) *Attorney, Agent, or Firm* — Leydig, Voit & Mayer, Ltd.

(57) ABSTRACT

A method for supporting MS ranging is provided in an embodiment of the present invention. The method includes: determining the public frame that is to be used for allocating the dedicated initial ranging transmission opportunity information; and notifying the MS of information about the determined public frame to potential target RSs. A BS and an RS are provided in embodiments of the present invention. This invention helps determine a public frame that is to be used for allocating the dedicated initial ranging transmission opportunity information for an MS in an MR radio telecommunication system, when the potential target BSs of the MS include RSs.

22 Claims, 7 Drawing Sheets

(56) References Cited

OTHER PUBLICATIONS

1st Office Action in corresponding Chinese Patent Application No. 200880000880.5 (Feb. 16, 2012).

Intellectual Property Office of the People'S Republic of China, 2nd Office Action in Chinese Patent Application No. 200880000880.5 (Jul. 26, 2012).

* cited by examiner

US 8,594,048 B2

METHOD, BASE STATION AND RELAY STATION FOR SUPPORTING MOBILE STATION RANGING

CROSS-REFERENCE TO RELATED APPLICATIONS

This application is a continuation of International Application No. PCT/CN2008/071268, filed on Jun. 11, 2008, which claims priority to Chinese Patent Application No. 200710112408.8, filed on Jun. 21, 2007, both of which are hereby incorporated by reference in their entireties.

FIELD OF THE INVENTION

The present invention is related to the radio telecommunication field, and in particular, to a method for supporting mobile station (MS) ranging, a base station (BS) and a relay station (RS).

BACKGROUND

With the continuous development of the telecommunication technologies, users' requirements for the access rate of a telecommunication system increase. To meet the requirements for the access rate, more and more importance is attached to Broadband Wireless Access (BWA) telecommunication systems. At present, a telecommunication system that is based on the IEEE 802.16e standard is a typical BWA telecommunication system.

As the radio telecommunication theory illustrates, the higher the transmitting frequency is, the faster the radio wave attenuates with the distance. According to this theory, because the working frequency of the 802.16e telecommunication system is high, the coverage scope of a BS in the system is limited. Accordingly, the IEEE 802.16j workgroup is constructing a radio telecommunication system that is based on the Multi-hop Relay (MR) technology. In an MR telecommunication system, an MS can communicate with a BS through one or more RSs.

In an MR radio telecommunication system, during the handover (HO) of an MS, each potential target BS (among the potential target BSs, one BS may become the target BS that the MS actually hands over to) needs to send the dedicated initial ranging transmission opportunity information to the MS. This information includes the MAC address of the MS (if the serving BS of the MS does not allocate a handover identity, HO_ID, to the MS) or the HO_ID of the MS (if the serving BS of the MS allocates an HO_ID to the MS), and the uplink (UL) transmission opportunity information. The UL transmission opportunity information includes the UL bandwidth, modulation and coding mode, and repeated coding mode. If the MS selects one of the potential target BSs as the HO target BS, the MS uses the dedicated initial ranging transmission opportunity information delivered by the HO target BS to quickly perform ranging, so that the MS can quickly hand over to the target cell.

At present, two methods are available for MS ranging during the HO of an MS.

FIG. 1 is a flowchart of a first method for supporting MS ranging in the prior art. The flowchart includes:

Step 1: The MS sends the MS Handover Request message (MOB_MSHO-REQ) to the serving BS.

Step 2: The current serving BS exchanges information with each neighbor BS or other network entities, such as the Authentication, Service, and Authorization (ASA) server, through the backbone network to determine all the potential target BSs and the public frame (each potential target BS allocates, in a same frame, i.e. the public frame, the dedicated initial ranging transmission opportunity information to the MS).

Step 3: The current serving BS sends the BS Handover Response message (MOB_BSHO-RSP) to the MS. This message carries the ID of each potential target BS, related handover information, and information about the public frame, in which each potential target BS allocates the dedicated initial ranging transmission opportunity information to the MS. The value of this public frame is calculated as follows: ID of the frame when the MS reads the dedicated initial ranging transmission opportunity information—ID of the frame when the MS receives MOB_BSHO-RSP.

Step 4: The MS sends the Handover Indication message (MOB_HO-IND) to the serving BS. The types of this message include "serving BS release", "HO cancel", and "HO rejection". When the type of the message is "serving BS release", it indicates that the MS determines to hand over.

Step 5: Each potential target BS allocates, in the public frame specified in step 2, the initial ranging transmission opportunity information to the MS. Each potential target BS sets a fast ranging information element (Fast_Ranging_IE) in the UL-MAP of the public frame, so as to allocate the initial ranging transmission opportunity information. If a potential target BS determines to cancel allocating the initial ranging transmission opportunity information to the MS, the BS does not allocate, in the public frame, the initial ranging transmission opportunity information to the MS. That is, during actual processing, the number of potential target BSs that allocate, in the determined public frame, the initial ranging transmission opportunity information to the MS may be 0, 1, or more.

FIG. 2 is a flowchart of a second method for supporting MS ranging in the prior art. Compared with the flowchart of the first method, the flowchart of the second method does not include the process of sending the handover request message from the MS to the current serving BS. In the flowchart of the second method, the current serving BS communicates with neighbor BSs to determine the potential target BSs and the public frame, in which each potential target BS allocates the dedicated initial ranging transmission opportunity information to the MS. The current serving BS carries information about the determined public frame in the BS Handover Request message (MOB_BSHO-REQ) and sends the message to the MS.

The inventor finds at least the following defects of the existing technologies:

In an MR radio telecommunication system, a non-transparent RS has the same ID type with the BS. That is, the MS may treat the non-transparent RS as a BS. In this case, the non-transparent RS may become a potential target BS of the MS. When the MS hands over to the non-transparent RS, fast ranging is required. The existing technology, however, does not provide the method that a non-transparent RS supports the MS's fast ranging.

SUMMARY

A method for supporting MS ranging is provided in an embodiment of the present invention to support MS ranging in an MR radio telecommunication system when potential target BSs may be RSs or when potential target BSs include RSs.

Accordingly, a BS and an RS are provided in embodiments of the present invention.

A method for supporting MS ranging is provided in an embodiment of the present invention. The method includes:

obtaining the channel quality indication provided by each target potential RS of an MS;

determining the public frame that is to be used for allocating the dedicated initial ranging transmission opportunity information; and notifying information about the determined public frame to the MS and the potential target RSs.

A BS is provided in an embodiment of the present invention. The BS includes an information obtaining unit, a public frame determining unit, and a public frame information notifying unit. The information obtaining unit is configured to obtain the channel quality indication provided by each potential target RS of the MS. The public frame determining unit is configured to determine, based on the channel quality indication, the public frame that is to be used for allocating the dedicated initial ranging transmission opportunity information. The public frame information notifying unit is configured to notify information about the determined public frame to the MS and the potential target RSs.

An RS is provided in an embodiment of the present invention. The RS includes an information providing unit, a public frame information receiving unit, and an information allocating unit. The information providing unit is configured to provide the current serving BS of the MS with the channel quality indication. The public frame information receiving unit is configured to receive information about the public frame that is to be used for allocating the dedicated initial ranging transmission opportunity information, where information about the public frame is notified by the current serving BS of the MS. The information allocating unit is configured to allocate, in the public frame, the dedicated initial ranging transmission opportunity information to the MS, when it is allowed to allocate, in the public frame, the dedicated initial ranging transmission opportunity information.

Compared with the existing technologies, the present invention allows a potential target RS to support fast ranging of an MS in an MR radio telecommunication system, when a non-transparent RS is a potential target station of the MS during handover.

DETAILED DESCRIPTION

The implementation processes and expected benefits of the technical scheme provided in the present invention are described below with reference to some accompanying drawings as follows.

Figure 1:
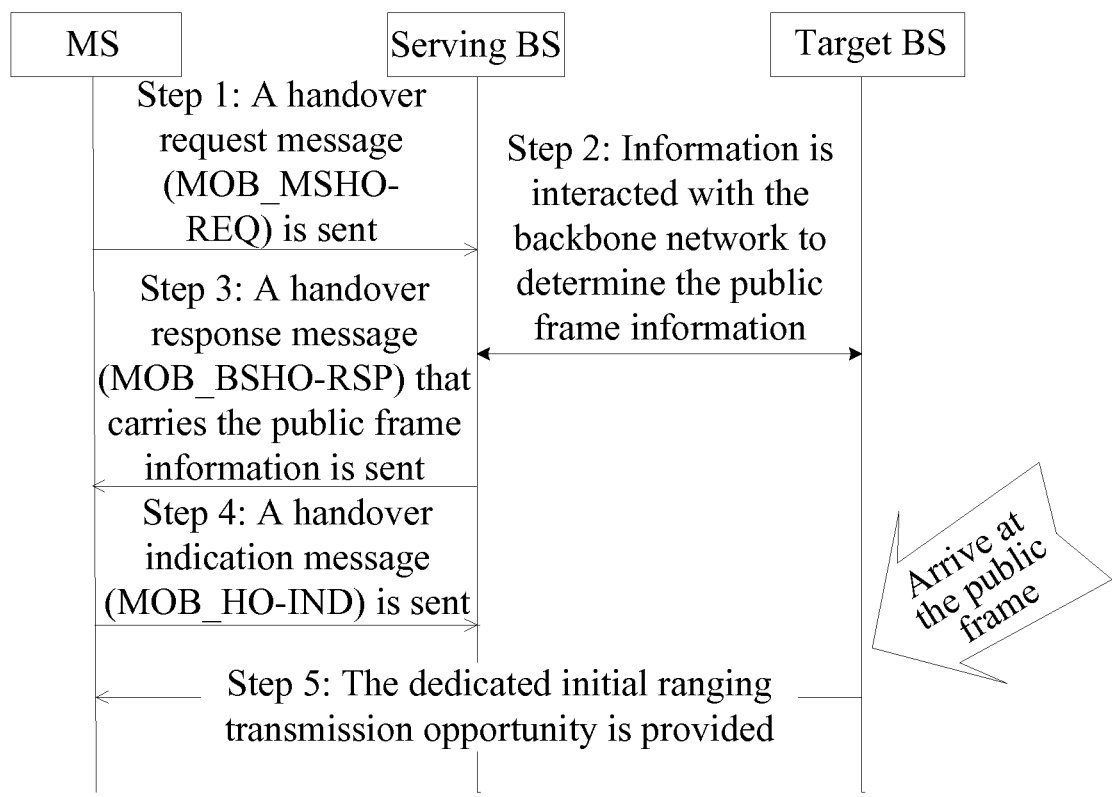
FIG. 1 is a flowchart of a first method for supporting MS ranging in the prior art.
Figure 2:
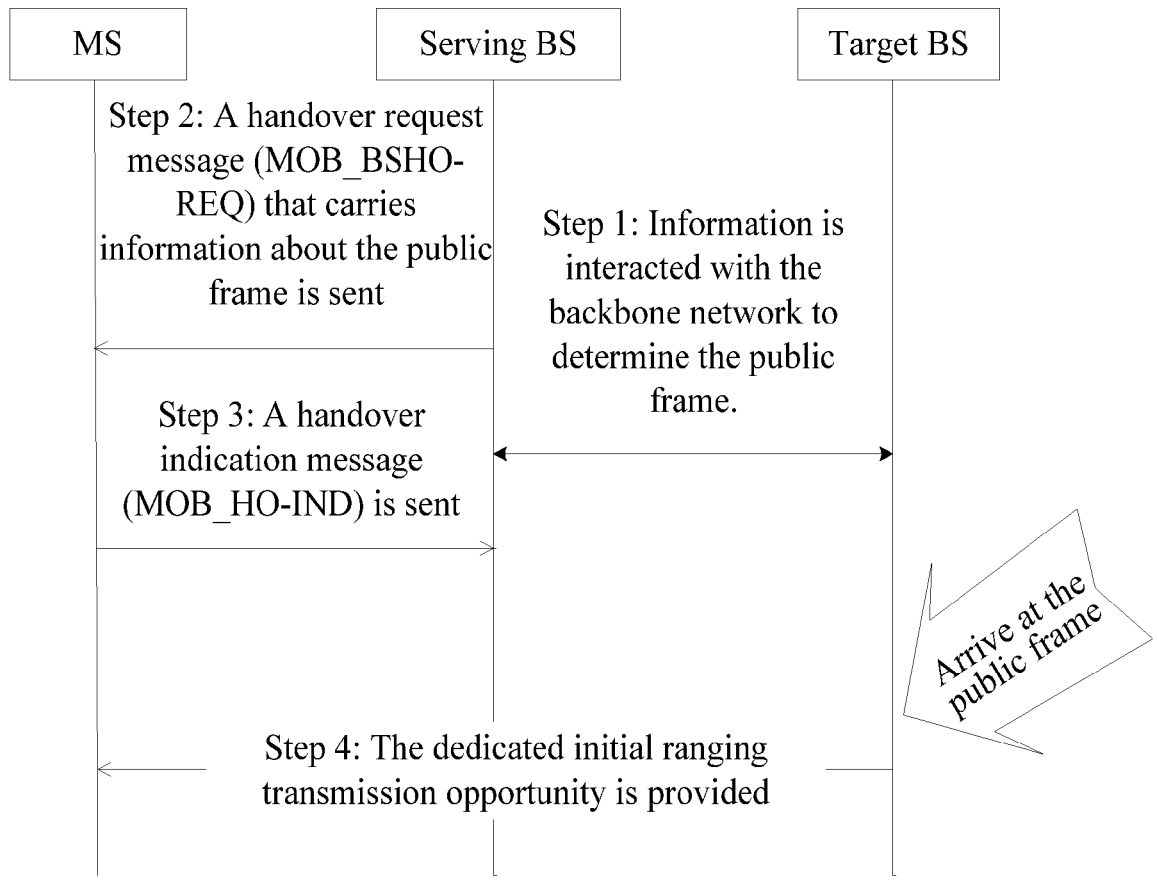
FIG. 2 is a flowchart of a second method for supporting MS ranging in the prior art.
Figure 3:
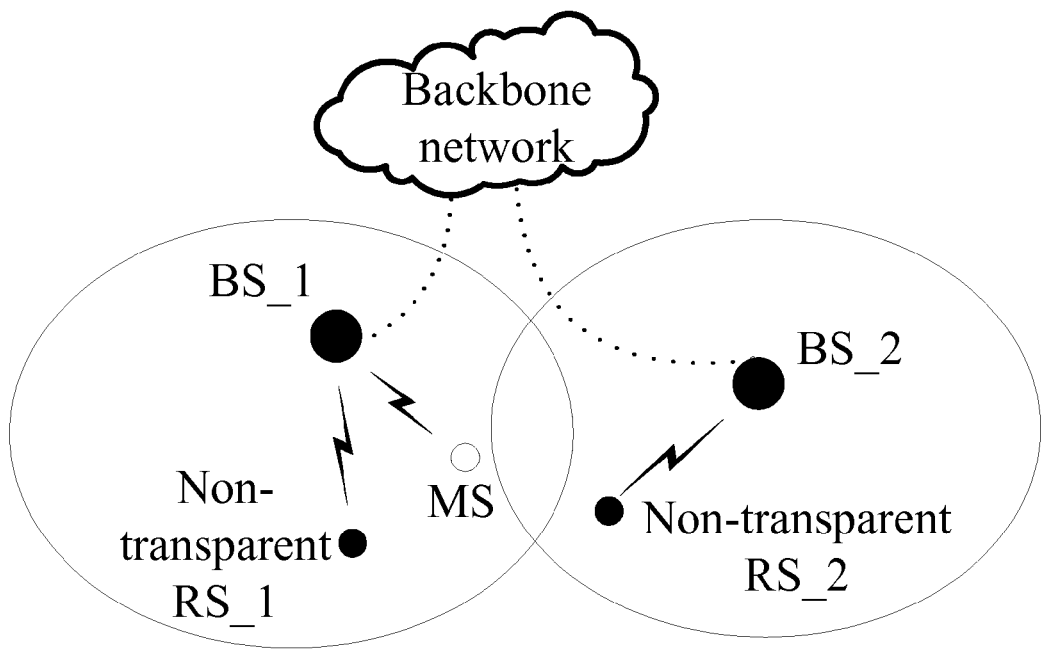
FIG. 3 shows a topology of an MR radio telecommunication system according to an embodiment of the present invention.

FIG. 3 shows a topology of an MR radio telecommunication system according to an embodiment of the present invention. BS_1 is the serving BS to the MS and non-transparent RS_1. BS_2 is the neighbor BS of BS_1, and also is the serving BS of the non-transparent RS_2. BS_1 and BS_2 exchange information with each other through the backbone network. Both RS_1 and RS_2 may be the potential target RSs of the MS during handover.

Figure 4:
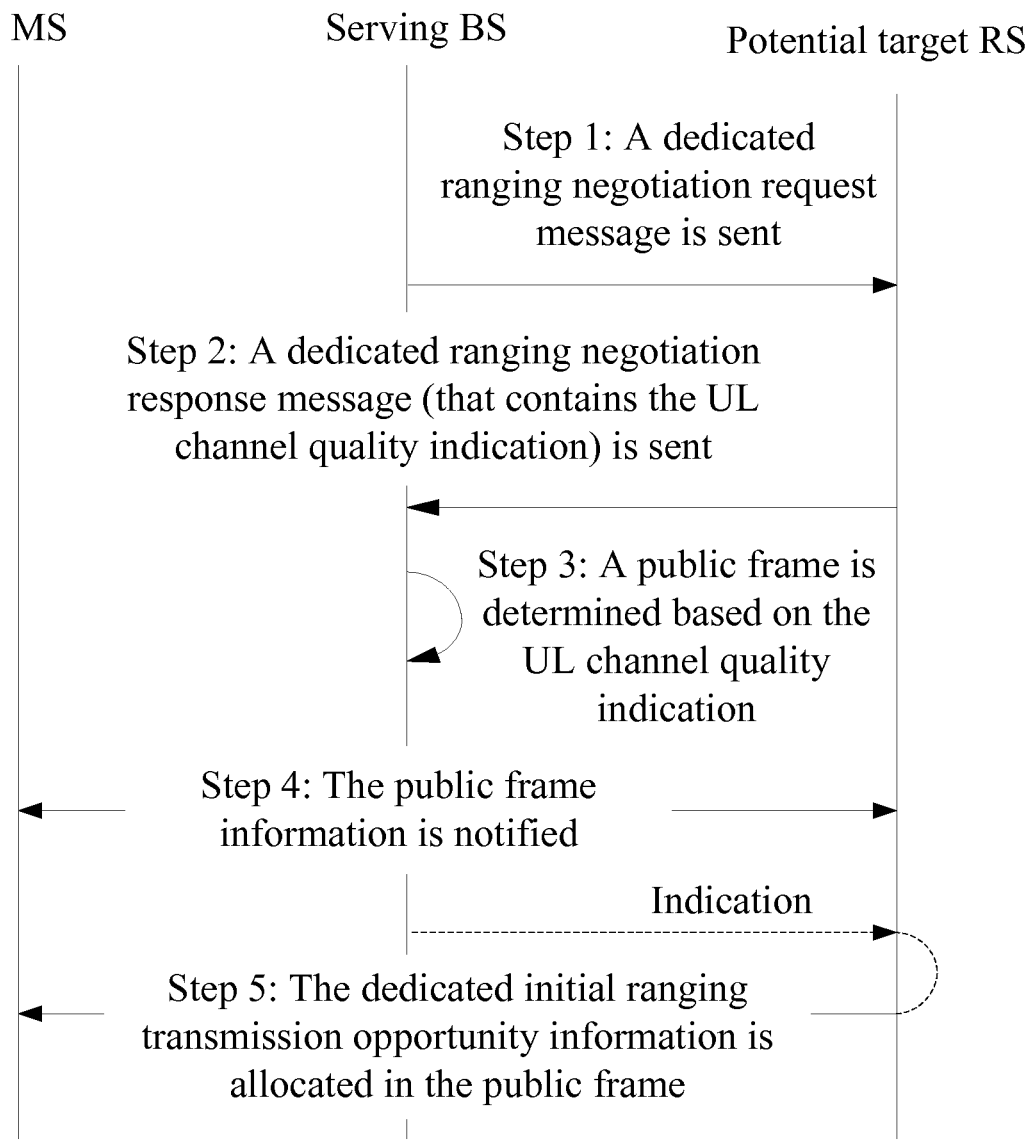
FIG. 4 is a flowchart of a method according to a first embodiment of the present invention.

FIG. 4 is a flowchart of a method according to a first embodiment of the present invention. In this embodiment, during handover of the MS, the current serving BS of the MS is the same as the current serving BS of each potential target RS, and the current serving BS of the MS notifies each potential target RS, of information about the public frame, before the MS reports the handover indication message to the current serving BS. The process includes:

Step 1: The current serving BS of the MS sends a dedicated ranging negotiation request message to each potential target RS. This message includes the MS ID, for example, MAC address of the MS.

Step 2: Each potential target RS of the MS returns a dedicated ranging negotiation response message to the current serving BS of the MS. This message includes the MS ID and validity flag (that is, "valid" or "invalid"). If the validity flag in the message indicates "valid", this message further includes the UL channel quality indication. The UL channel quality indication can include the effective time information about the channel parameters maintained by each potential target RS. A potential target RS regards that, during the period specified by the effective time information about the channel parameters, the UL channel parameters obtained by MS in the associating process are valid. The effective time information about channel parameters may be:

the ID of the first frame that indicates invalid channel parameters; or the lower bits (for example, lower eight bits) of the ID of the first frame that indicates invalid channel parameters; or the ID of the last frame that indicates valid channel parameters; or the lower bits (for example, lower eight bits) of the ID of the last frame that indicates valid channel parameters; or the difference between the ID of the first frame that indicates invalid channel parameters and the ID of the current frame; or the difference between the ID of the last frame that indicates valid channel parameters and the ID of the current frame.

Step 3: Based on the UL channel quality indication in the dedicated ranging negotiation response message, which carries the "valid" flag and is provided by each potential target RS, the current serving BS of the MS determine the public frame that is to be used for allocating the dedicated initial ranging transmission opportunity information.

Step 4: The current serving BS of the MS carries information about the determined public frame in the MOB_BSHO-REQ message or the MOB_BSHO-RSP message and sends the message to the MS. In addition, the current serving BS carries information about the determined public frame in the dedicated ranging allocation message and sends the message to each potential target RS. The public frame information sent to the potential target RSs can be represented by the difference between the ID of the public frame and the ID of the frame when the target RS receives the message, the public frame ID, or the lower bits (for example, lower eight bits) of the public frame ID. In addition, the dedicated ranging allocation message includes the MS ID or HO_ID, destination indication (indicating "allocating").

Step 5: Each potential target RS may allocate, in the determined public frame, the dedicated initial ranging transmission opportunity information to the MS by default. Alternatively, under the instruction of the MS's current serving BS, each potential target RS may also determine whether to allocate, in the determined public frame, the dedicated initial ranging transmission opportunity information to the MS. This situation includes two scenarios.

Scenario 1: The current serving BS of the MS receives the handover indication message (MOB_HO-IND) reported by the MS. If this message indicates "serving BS release", it indicates that the MS agrees on handover. In this case, the serving BS sends a dedicated ranging allocation message to non-target RSs among the potential target RSs based on the target RS ID carried in the MOB_HO-IND message, so as to notify the non-target RSs to cancel allocating, in the determined public frame, the dedicated initial ranging transmission opportunity information to the MS. The dedicated ranging allocation message includes the MS ID and destination indication (indicating "cancel"). Among the potential target RSs, the target RS of the MS allocates, in the determined public frame, the dedicated initial ranging transmission opportunity information to the MS, and other potential RSs do not allocate, in the determined public frame, the dedicated initial ranging transmission opportunity information to the MS.

For the potential target RS that serves as the target RS of the MS, if the handover indication message reported by the MS carries a ranging parameter validity flag that indicates "invalid" parameters, the current serving BS needs to notify this RS to cancel allocating, in the determined public frame, the dedicated initial ranging transmission opportunity information to the MS. In this case, the potential target RS that serves as the target RS of the MS does not allocate, in the determined public frame, the dedicated initial ranging transmission opportunity information to the MS. Alternatively, in this scenario, the current serving BS may also only notify the potential target RS, which serves as the target RS of the MS, of the "pending" result through a dedicated ranging allocation message, but do not determine whether the RS allocates the dedicated initial ranging transmission opportunity information to the MS. Instead, the target RS itself determines whether to allocate, in the determined public frame, the dedicated initial ranging transmission opportunity information to the MS. The dedicated ranging allocation message includes the MS ID, destination indication (indicating "pending"), and validity of ranging parameters.

Scenario 2: The current serving BS of the MS receives the handover indication message (MOB_HO-IND) reported by the MS. If the message indicates "HO rejection" or "HO cancel", it indicates that the MS rejects handover or cancels handover. In this case, the current serving BS sends a dedicated ranging allocation message to each potential target RS to notify these potential target RSs to cancel allocating, in the determined public frame, the dedicated initial ranging transmission opportunity information to the MS. The dedicated ranging allocation message includes the MS ID and destination indication (indicating "cancel"). Then the potential target RSs do not allocate, in the determined public frame, the dedicated initial ranging transmission opportunity information to the MS.

The preceding destination indication may be indicated by a binary bit. For example, 0 indicates "allocating", and 1 indicates "cancel"; or 0 indicates "allocating", and 1 indicates "pending". Two binary bits may also be used. For example, 00 indicates "allocating", 01 indicates "cancel", and 10 indicates "pending".

Figure 5:
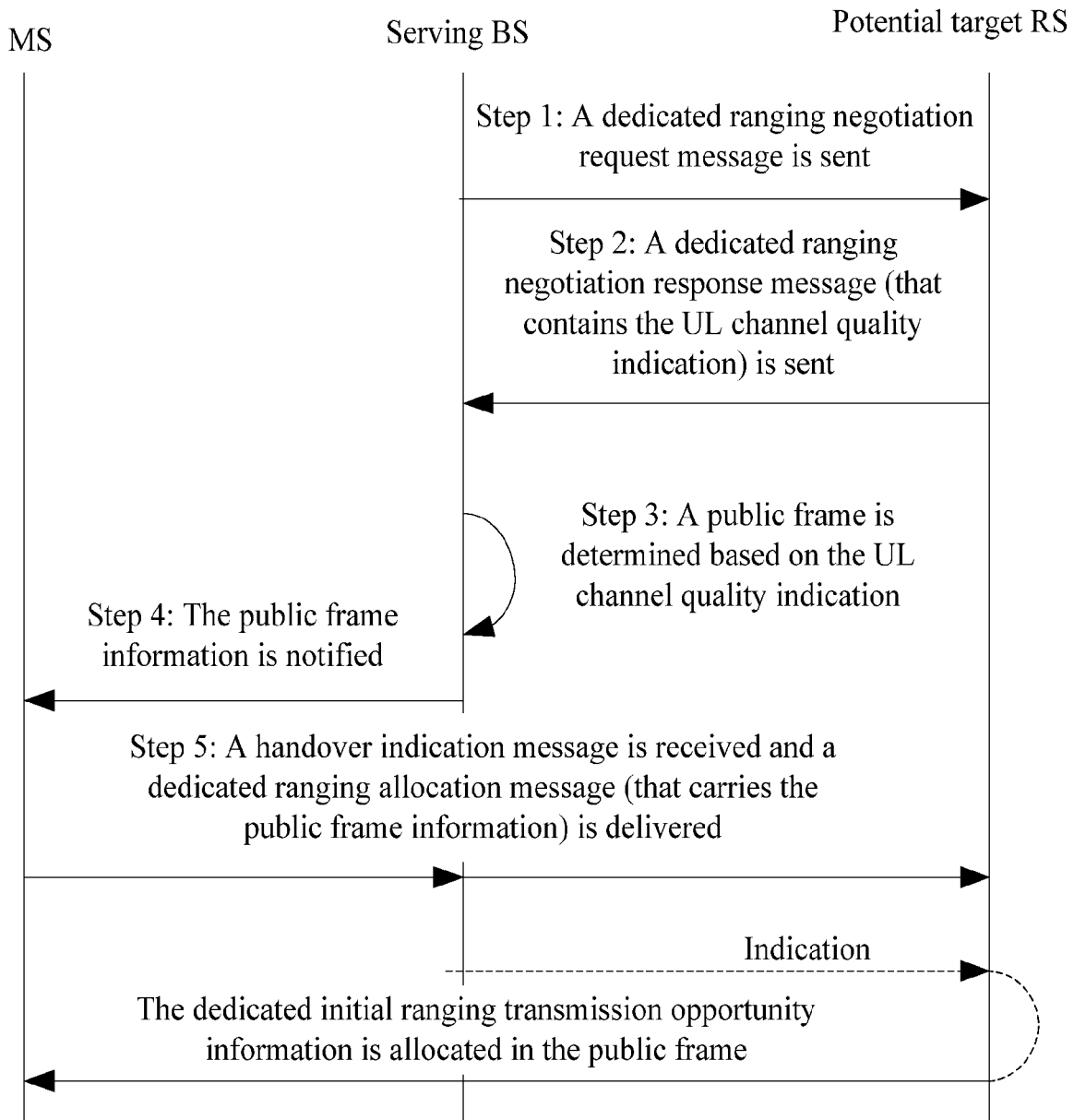
FIG. 5 is a flowchart of a method according to a second embodiment of the present invention.

FIG. 5 is a flowchart of a method according to a second embodiment of the present invention. In this embodiment, during handover of the MS, the current serving BS of the MS is the same as the current serving BS of each potential target RS, and the current serving BS of the MS notifies each potential target RS of information about the public frame, after the MS reports the handover indication message to the current serving BS. The procedure for determining the public frame that is to be used for allocating the dedicated initial ranging transmission opportunity information to the MS is the same as steps 1 to 3 in the first embodiment. These steps are not repeated here. The steps after step 3 are described as follows:

Step 4: The current serving BS of the MS carries information about the determined public frame in the MOB_BSHO-REQ message or the MOB_BSHO-RSP message and sends the message to the MS.

Step 5: The current serving BS of the MS receives the handover indication message (MOB_HO-IND) reported by the MS. If this message indicates serving "BS release", it indicates that the MS agrees on handover. When the handover indication message does not indicate the determined target handover RS of the MS, the current serving BS of the MS carries information about the determined public frame in a dedicated ranging allocation message and sends the message to each potential target RS. The potential target RSs allocate the dedicated initial ranging transmission opportunity information to the MS by default. If the handover indication message indicates a determined handover target RS of the MS, and the ranging parameter validity flag in the message shows "parameter being valid", the serving BS of the MS carries information about the determined public frame in a dedicated ranging allocation message carrying the destination indication as "allocate", and sends the message to the target RS of the MS. The target RS allocates the dedicated initial ranging transmission opportunity information to the MS. Alternatively, if the handover indication message indicates a determined handover target RS of the MS, the serving BS of the MS may notify the target RS, of information about the public frame and ranging parameter validity flag, through a dedicated ranging allocation message carrying the destination indication as "pending". The target RS of the MS determines whether to allocate, in the determined public frame, the dedicated initial ranging transmission opportunity information to the MS.

The preceding destination indication can be indicated by a binary bit. For example, 0 indicates "allocating", and 1 indicates "cancel"; or 0 indicates "allocating", and 1 indicates "pending".

Alternatively, in the procedure for determining the public frame (steps 1 to 3) in the first and second embodiments, each potential target RS of the MS may directly provide its own UL channel quality indication to the current serving BS of the MS, after associating with the MS; or each potential target RS of the MS may provide its own UL channel quality indication to a third-party network entity, and the current serving BS of the MS interacts with the third-party network entity to obtain the UL channel quality indication provided by each potential target RS of the MS.

Figure 6:
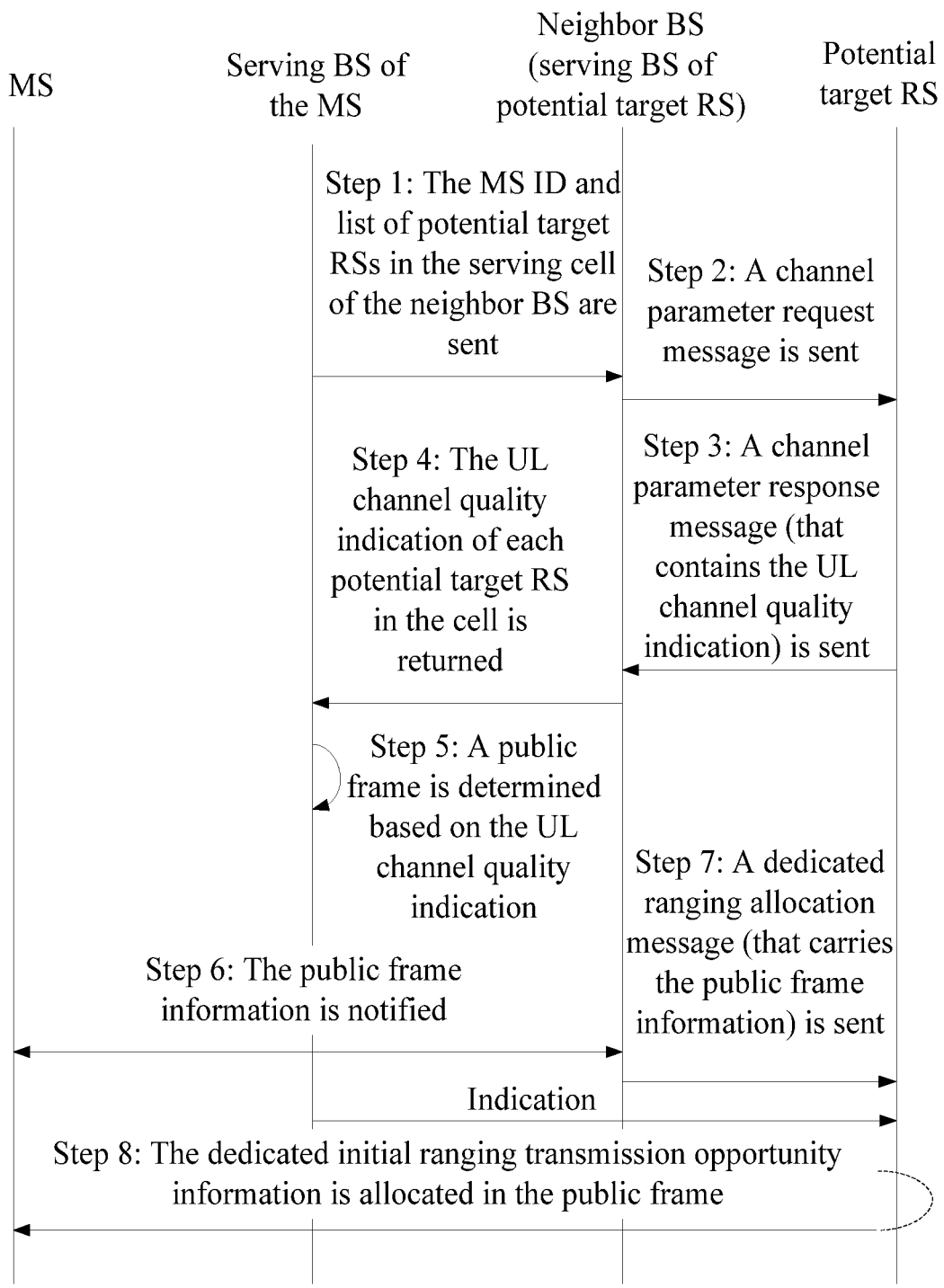
FIG. 6 is a flowchart of a method according to a third embodiment of the present invention.

FIG. 6 is a flowchart of a method according to a third embodiment of the present invention. In this embodiment, during handover of the MS, the current serving BS of the MS is the same as the current serving BS of each potential target RS, and the current serving BS of the MS notifies each potential target RS, of information about the public frame, before the MS reports the handover indication message to the current serving BS. The process includes:

Step 1: The current serving BS of the MS sends the MS ID and a list of potential target RSs in the serving cell of a neighbor BS to each neighbor BS (possibly the serving BS of the potential target RSs of the MS).

Step 2: Each neighbor BS sends a channel parameter request message to the potential target RSs based on the list of potential target RSs in its own serving cell. This message includes the MS ID, for example, MAC address of the MS.

Step 3: Each potential target RS of the MS returns a channel parameter response message to the current serving BS of the MS. This message includes the MS ID and validity flag (that is, "valid" or "invalid"). If the validity flag in the message indicates "valid", this message further includes the UL channel quality indication. The UL channel quality indication may include the effective time information about the channel parameters maintained by the potential target RS. A potential target RS regards that, during the period specified by the effective time information about the channel parameters, the UL channel parameters obtained in the associating process are valid. The effective time information about channel parameters may be:

the ID of the first frame that indicates invalid channel parameters; or the lower bits (for example, lower eight bits) of the ID of the first frame that indicates invalid channel parameters; or the ID of the last frame that indicates valid channel parameters; or the lower bits (for example, lower eight bits) of the ID of the last frame that indicates valid channel parameters; or the difference between the ID of the first frame that indicates invalid channel parameters and the ID of the current frame; or the difference between the ID of the last frame that indicates valid channel parameters and the ID of the current frame.

Step 4: Each neighbor BS identifies, within its own coverage, each potential target RS that has fed back UL channel quality indication, and sends the ID of each potential target RS and the related UL channel quality indication to the current serving BS of the MS, and sends the related UL channel quality indication to the current serving BS of the MS. When the UL channel quality indication is the same as the effective time information about the channel parameters, each neighbor BS can send the public interval of the effective time interval for the channel parameters of each potential target RS in the serving cell of the neighbor BS to the current serving BS of the MS.

Step 5: The current serving BS of the MS determines the public frame that is to be used for allocating the dedicated initial ranging transmission opportunity information based on the information returned by each neighbor BS.

Step 6: The current serving BS of the MS sends information about the determined public frame through the MOB_BSHO-REQ message or the MOB_BSHO-RSP message to the MS and notifies the neighbor BSs of information about the determined public frame. In addition, the current serving BS of the MS sends a list of potential target RSs in the serving cell of each neighbor BS to the neighbor BS.

Step 7: Each neighbor BS sends a dedicated ranging allocation message to the potential target RSs in the serving cell of the BS. This message includes the MS ID or HO_ID, destination indication (indicating "allocating"), and information about the public frame. Information about the public frame can be represented by the difference between the ID of the public frame and the ID of the frame when the target RS receives the message, the public frame ID, or the lower bits (for example, lower eight bits) of the public frame ID.

The subsequent procedure is basically the same as step 5 in the first embodiment. The difference is as follows: When the current serving BS of the MS notifies potential target RSs of the relevant message, the serving BS of the MS needs to send the message to the current serving BS of the potential target RSs; the current serving BS of the potential target RSs sends the notification message to each potential target RS. The remaining details of the step are similar to those in step 5 in the first embodiment, and are not repeated here.

Figure 7:
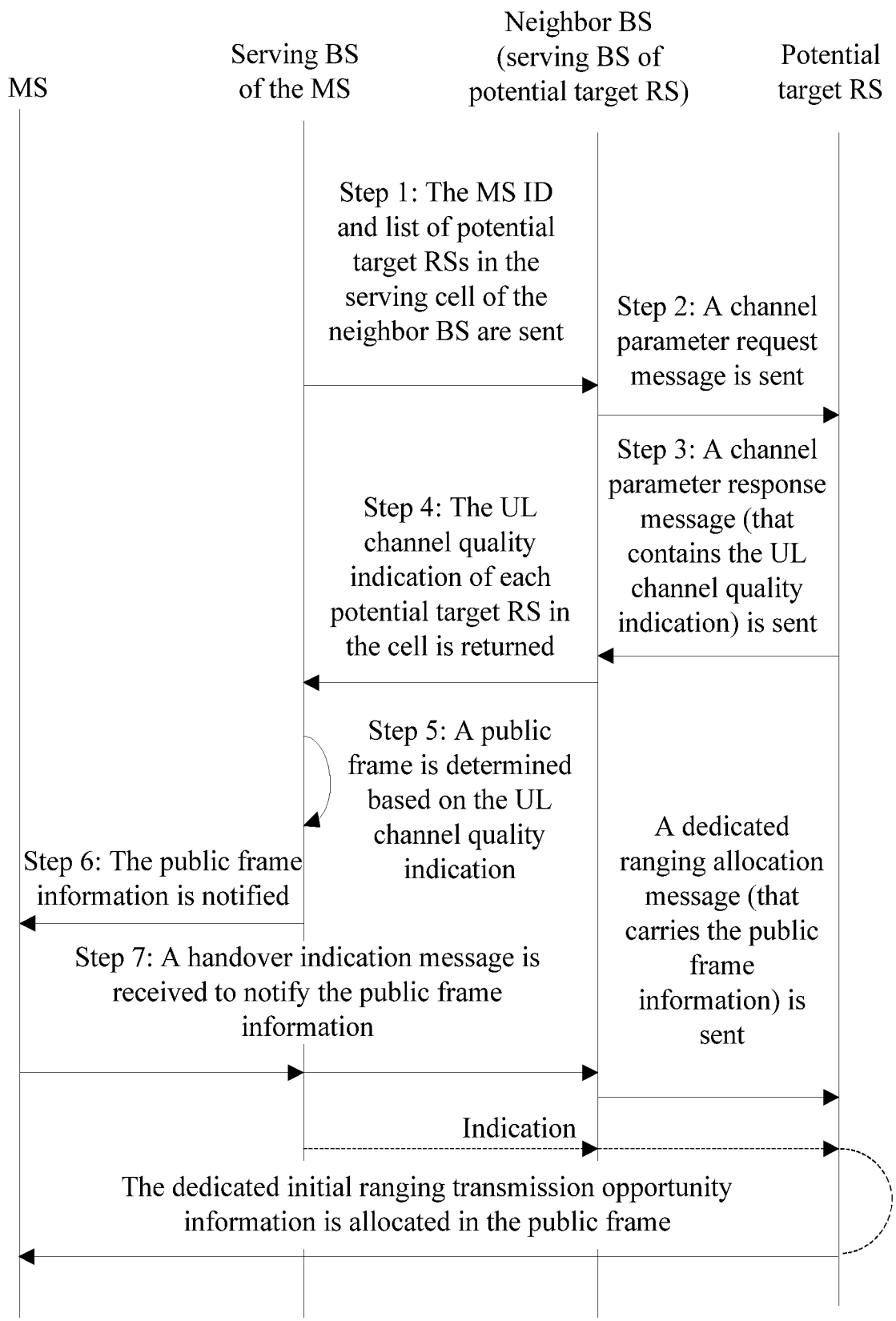
FIG. 7 is a flowchart of a method according to a fourth embodiment of the present invention.

FIG. 7 is a flowchart of a method according to a fourth embodiment of the present invention. In this embodiment, during handover of the MS, the current serving BS of the MS is different from the current serving BS of each potential target RS, and the current serving BS of the MS notifies each potential target RS of the public frame information after the MS reports the handover indication message to the current serving BS. The procedure for determining the public frame that is to be used for allocating the dedicated initial ranging transmission opportunity information to the MS is similar to steps 1 to 5 in the third embodiment. These steps are not repeated here. The steps after step 5 are described as follows:

Step 6: The current serving BS of the MS carries information about the determined public frame in the MOB_BSHO-REQ message or the MOB_BSHO-RSP message and sends the message to the MS.

Step 7: The current serving BS of the MS receives the handover indication message (MOB_HO-IND) reported by the MS. If this message indicates "serving BS release", it indicates that the MS agrees on handover. When the handover indication message does not indicate the determined target handover RS of the MS, the current serving BS of the MS carries information about the determined public frame and MS ID or HO_ID in a dedicated ranging allocation message and sends the message to each neighbor BS. Each neighbor BS then sends the message to the potential target RSs in the serving cell of the BS. The potential target RSs allocate the dedicated initial ranging transmission opportunity information to the MS by default. The dedicated ranging allocation message includes the MS ID or HO_ID, destination indication (indicating "allocating"). When sending information about the determined public frame and MS ID or HO_ID to the neighbor BS, the current serving BS of the MS may further send a list of potential target RSs in the serving cell of each neighbor BS to the neighbor BSs. When the handover indication message indicates the determined handover target RS of the MS, the current serving BS of the MS determines, based on the target RS information carried in the handover indication message, whether the target RS allocates, in the public frame, a dedicated initial ranging transmission opportunity to the MS. If it is determined that the target RS allocates, in the public frame, a dedicated initial ranging transmission opportunity to the MS, the serving BS of the MS sends information about the determined public frame and MS ID or HO_ID to the current serving BS of the target RS of the MS. The current serving BS of the target RS sends a dedicated ranging allocation message, carrying information about the public frame, to the target RS of the MS. The target RS of the MS allocates, in the determined public frame, the dedicated initial ranging transmission opportunity information to the MS. The dedicated ranging allocation message includes the MS ID or HO_ID, destination indication (indicating "allocating").

Optionally, if the handover indication message indicates the determined handover target RS of the MS, the current serving BS of the MS can send the public frame, ranging parameter validity flag, MS ID or HO_ID to the current serving BS of the target RS of the MS. In this case, two processing methods are available.

Method 1: The current serving BS of the target RS of the MS determines whether the target RS allocates, in the public frame, dedicated initial ranging transmission opportunity to the MS. If the target RS allocates, in the public frame, a dedicated initial ranging transmission opportunity to the MS, the serving BS of the target RS sends information about the determined public frame, MS ID or HO_ID, and destination indication (indicating "allocating") through a dedicated ranging allocation message to the target RS of the MS. The target RS of the MS allocates, in the determined public frame, the dedicated initial ranging transmission opportunity information to the MS.

Method 2: The serving BS of the target RS sends information about the determined public frame, MS ID or HO_ID, and destination indication (indicating pending) through a dedicated ranging allocation message to the target RS of the MS. The target RS of the MS determines whether to allocate, in the determined public frame, the dedicated initial ranging transmission opportunity information to the MS.

The preceding destination indication can be indicated by a binary bit. For example, 0 indicates "allocating", and 1 indicates "cancel"; or 0 indicates "allocating", and 1 indicates "pending".

Alternatively, in the procedure for determining the public frame (steps 1 to 5) the third and fourth embodiments, each potential target RS of the MS can directly provide its own UL channel quality indication through its own serving BS to the current serving BS of the MS after associating with the MS; or provide its own UL channel quality indication to a third-party network entity. The current serving BS of the MS interacts with the third-party network entity to obtain the UL channel quality indication provided by each potential target RS of the MS.

Another implementation scenario is as follows: The current serving BS of the MS notifies certain potential target RSs of information about the determined public frame. If the handover indication message reported by the MS indicates that the MS agrees on handover, the current serving BS of the MS determines whether the handover target RS of the MS contained in the handover indication message is included in the notified potential target RSs. If the handover target RS is included in the notified potential target RSs, the current serving BS of the MS notifies the notified potential target RSs except the target RS to cancel allocating, in the public frame, the dedicated initial ranging transmission opportunity information to the MS. If the target RS is not included in the notified potential target RSs, the current serving BS of the MS notifies all the notified potential target RSs to cancel allocating, in the public frame, the dedicated initial ranging transmission opportunity information to the MS, and notifies the target RS of information about the determined public frame. In this case, the target RS of the MS allocates, in the public frame, the dedicated initial ranging transmission opportunity information to the MS. If the handover indication message reported by the MS indicates that the MS refuses to hand over or cancel handover, the current serving BS of the MS notifies all the notified potential target RSs to cancel allocating, in the public frame, the dedicated initial ranging transmission opportunity information to the MS. For the situation when "the handover target RS is included in the notified potential target RSs", alternatively, the current serving BS of the MS can send the ranging parameter validity information to the target RS or the serving BS of the target RS, and then the target RS or the serving BS of the target RS determines whether the target RS cancels allocating, in the public frame, the dedicated initial ranging transmission opportunity information to the MS. If the target RS decides to cancel allocating, in the public frame, the dedicated initial ranging transmission opportunity information to the MS, the RS cancels allocating, in the public frame, the dedicated initial ranging transmission opportunity information to the MS. If the serving BS of the target RS decides to cancel allocating, in the public frame, the dedicated initial ranging transmission opportunity information to the MS, the serving BS of the target RS sends a dedicated ranging allocation message to the target RS. This message contains the MS ID or HO_ID, destination indication (indicating "cancel").

Figure 8:
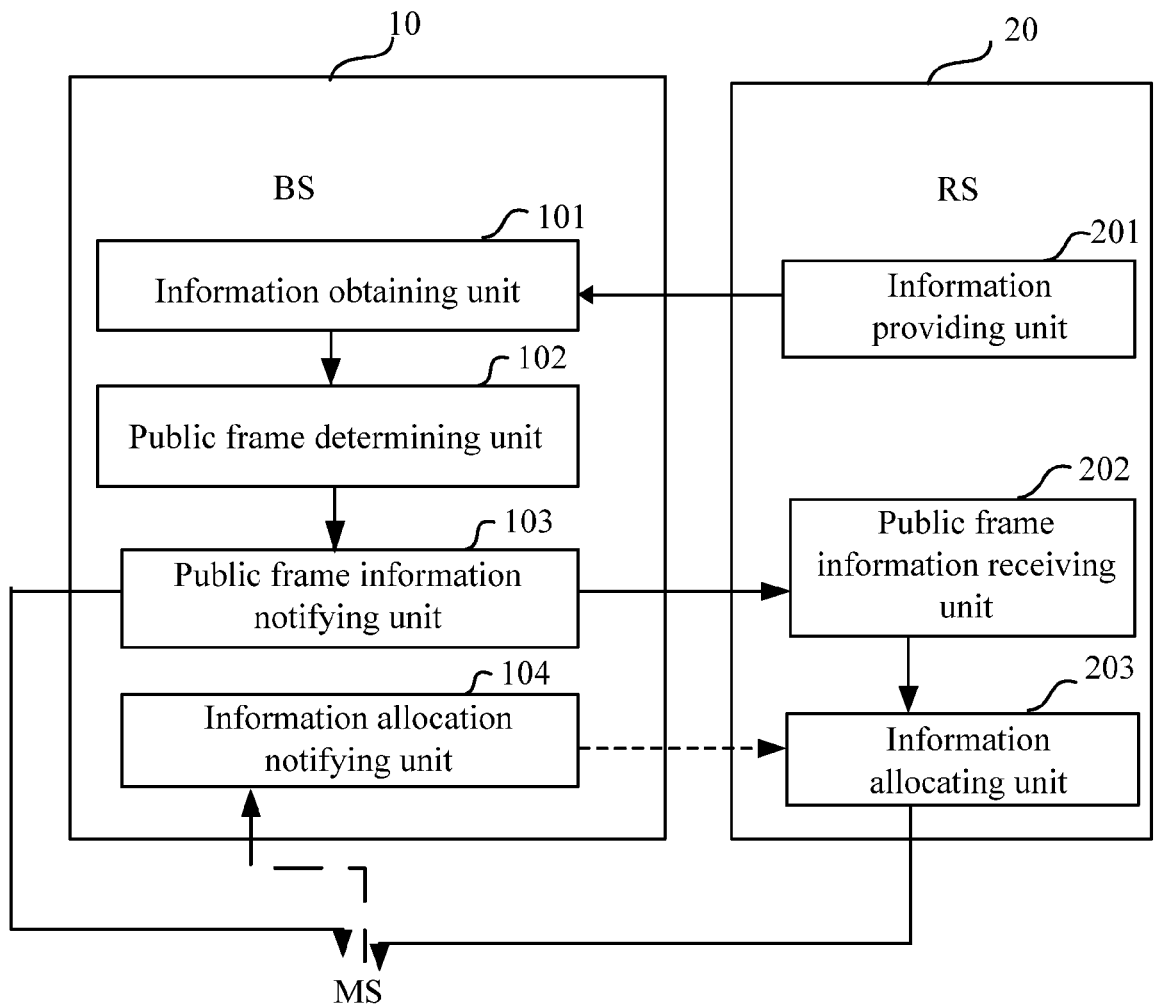
FIG. 8 shows a structure of a BS and a structure of an RS according to an embodiment of the present invention.

FIG. 8 shows a structure of a BS and a structure of an RS according to embodiments of the present invention. BS 10 includes: an information obtaining unit 101, a public frame determining unit 102, and a public frame information notifying unit 103. The information obtaining unit is configured to obtain the UL channel quality indication information provided by each potential target RS of the MS. The public frame determining unit is configured to determine the public frame that is to be used for allocating the dedicated initial ranging transmission opportunity information based on the UL channel quality indication obtained by the information obtaining unit 101, and preferably, the public frame determining unit can determine, based on the effective time information about the channel parameters maintained by each potential target RS in the channel quality indication, the public frame that is to be used for allocating the dedicated initial ranging transmission opportunity information.

BS 10 can further include an information allocation notifying unit 104. The information allocation notifying unit is configured to notify, based on the ranging parameter validity flag and the handover indication contained in the handover indication message reported by the MS, the potential target RSs that obtain information about the public frame, about whether the RSs can allocate, in the public frame notified by the public frame information notifying unit 103, dedicated initial ranging transmission opportunity information to the MS. For example, if the handover indication message reported by the MS indicates that the MS agrees on handover, the information allocation notifying unit 104 can notify, based on the information about the actual target RS contained in the handover indication message, other non-target RSs in the potential target RSs to cancel allocating (that is, not to allocate), in the public frame notified by the public frame information notifying unit 103, dedicated initial ranging transmission opportunity information to the MS. In this case, only the actual target RS allocates, in the public frame, the dedicated initial ranging transmission opportunity information to the MS. Alternatively, if the handover indication message reported by the MS indicates that the MS rejects handover, the information allocation notifying unit 104 can notify, based on the information about the actual target RS contained in the handover indication message, all the potential target RSs to cancel allocating (that is, not to allocate), in the public frame notified by the public frame information notifying unit 103, dedicated initial ranging transmission opportunity information to the MS. In this case, the potential target RSs do not allocate, in the public frame, the dedicated initial ranging transmission opportunity information to the MS.

Implementation case 1: The information obtaining unit 101 can include a sub unit configured to send a dedicated ranging negotiation request message to each potential target RS and a sub unit configured to receive a dedicated ranging negotiation response message from each potential target RS. Whereas, the dedicated ranging negotiation response message carries the channel quality indication information provided by each potential target RS. This implementation case is applicable to the scenario when the current serving BS of the MS is the same as the current serving BS of the potential target RSs.

Implementation case 2: The information obtaining unit 101 can include a sub unit configured to send a list of potential target RSs of the MS to the neighbor BS and a sub unit configured to receive the channel quality indication information provided by each potential target RS from the neighbor BS. This implementation case is applicable to the scenario when the current serving BS of the MS is different from the current serving BS of the potential target RSs.

In addition, the information obtaining unit 101 can interact with a third-party network entity to obtain the channel quality indication information provided by each potential target RS of the MS to the third-party network entity.

RS 20 includes:

an information providing unit 201, configured to provide its own UL channel quality indication information to the current serving BS of the MS;

a public frame information receiving unit 202, configured to receive information about the public frame that is to be used for allocating the dedicated initial ranging transmission opportunity information, where the information about the public frame is notified by the current serving BS of the MS; and an information allocating unit 203, configured to: determine, according to the instruction from the current serving BS of the MS, whether it is allowed to allocate, in the public frame received by the public frame information receiving unit 202, the dedicated initial ranging transmission opportunity information; and allocate, in the public frame received by the public frame information receiving unit 202, the dedicated initial ranging transmission opportunity information, when it is allowed to allocate, in the public frame, the dedicated initial ranging transmission opportunity information.

Through the preceding descriptions of the implementation modes, those skilled in the art can apparently understand that this invention can be implemented through hardware or through a software program with a necessary general hardware platform. The technical solution provided by the present invention can be embodied in the form of a software product. Such a software product can be stored in non-volatile storage media, such as CD-ROM, memory disk, and mobile disk and include instructions that are configured to enable a computer device, such as a personal computer, a server, and a network device, to execute the methods provided in the preceding embodiments of the present invention.

The protection scope of the invention is not confined to the preceding embodiments of the present invention. This invention is intended to cover all the modifications, equivalent replacements, and improvements of this invention provided that they fall in the scope of the spirit and principles of this invention.

What is claimed is:

1. A method for supporting mobile station (MS) ranging, applied to a telecommunication system with non-transparent relay stations (RSs) as potential target RSs of an MS during a handover, comprising:

determining public frame information of a public frame that is to be used for allocating dedicated initial ranging transmission opportunity information;

carrying the determined public frame information in a dedicated ranging allocation message;

obtaining channel quality indication provided by each potential target RS of the MS; and sending the dedicated ranging allocation message to the potential target RSs of the MS;

wherein the dedicated initial ranging transmission opportunity information is used by the MS to perform ranging to a handover target RS in the potential target RSs;

wherein the determined public frame information is based on effective time information about channel parameters in the channel quality indication and comprises one of the group consisting of:

a difference between an ID of the public frame and an ID of a frame when the handover target RS receives the dedicated ranging allocation message; and lower bits of the public frame ID.

2. The method according to claim 1, wherein the public frame information is determined based on the channel quality indication.

3. The method according to claim 1, wherein the dedicated ranging allocation message comprises an MS ID or a handover (HO) ID, and destination indication that indicates "allocating".

4. The method according to claim 1, further comprising:

receiving a handover indication message reported by the MS that the MS agrees on handover; and notifying a non-target RS to cancel allocating, in the public frame, the dedicated initial ranging transmission opportunity information to the MS.

5. The method according to claim 1, further comprising:

receiving a handover indication message, reported by the MS, indicating that the MS rejects handover or cancels handover; and notifying each potential target RS to cancel allocating, in the public frame, the dedicated initial ranging transmission opportunity information to the MS.

6. The method according to claim 1, wherein a current serving Base Station (BS) of the MS is different from a current serving BS of the potential target RSs, the step of sending the dedicated ranging allocation message to the potential target RSs of the MS comprises:

sending the dedicated ranging allocation message to the potential target RSs of the MS via the current serving BS of the potential target RSs.

7. The method according to claim 2, wherein the channel quality indication comprises effective time information about channel parameters which comprises one of the following information:

an ID of a first frame that indicates invalid channel parameters;

lower bits of the ID of the first frame that indicates the invalid channel parameters;

an ID of a last frame that indicates valid channel parameters;

lower bits of the ID of the last frame that indicates the valid channel parameters;

a difference between the ID of the first frame that indicates the invalid channel parameters and an ID of a current frame; and a difference between the ID of the last frame that indicates the valid channel parameters and the ID of the current frame.

8. A base station (BS), applied to a telecommunication system with non-transparent relay stations (RSs) as potential target RSs of a mobile station (MS) during a handover, configured to:

determine public frame information of a public frame that is to be used for allocating dedicated initial ranging transmission opportunity information;

carrying the determined public frame information in a dedicated ranging allocation message; and obtaining channel quality indication provided by each potential target RS of the MS; and sending the dedicated ranging allocation message to the potential target RSs of the MS;

wherein the dedicated initial ranging transmission opportunity information is used by the MS to perform ranging to a handover target RS in the potential target RSs;

wherein the determined public frame information is based on effective time information about channel parameters in the channel quality indication and comprises one of the group consisting of:

a difference between an ID of the public frame and an ID of a frame when the handover target RS receives the dedicated ranging allocation message; and lower bits of the public frame ID.

9. The base station according to claim 8, wherein the public frame information is determined based on the channel quality indication.

10. The base station according to claim 8, wherein the dedicated ranging allocation message comprises an MS ID or a handover (HO) ID, and destination indication that indicates "allocating".

11. The base station according to claim 8, further configured to:

receive a handover indication message reported by the MS that the MS agrees on the handover; and notify a non-target RS to cancel allocating, in the public frame, the dedicated initial ranging transmission opportunity information to the MS.

12. The base station according to claim 8, further configured to:

receive a handover indication message reported by the MS that the MS rejects the handover or cancels the handover; and notify each potential target RS to cancel allocating, in the public frame, the dedicated initial ranging transmission opportunity information to the MS.

13. The base station according to claim 8, wherein the BS of the MS is different from a current serving BS of the potential target RSs, and the BS is configured to:

send the dedicated ranging allocation message to the current serving BS of the potential target RSs in order that the current serving BS of the potential target RSs sends the dedicated ranging allocation message to each potential target RS.

14. The base station according to claim 9, wherein the channel quality indication comprises effective time information about channel parameters which comprises one of the following information:

an ID of a first frame that indicates invalid channel parameters;

lower bits of the ID of the first frame that indicates the invalid channel parameters;

an ID of a last frame that indicates valid channel parameters;

lower bits of the ID of the last frame that indicates the valid channel parameters;

a difference between the ID of the first frame that indicates the invalid channel parameters and an ID of a current frame; and a difference between the ID of the last frame that indicates the valid channel parameters and the ID of the current frame.

15. A relay station (RS), applied to a telecommunication system as a potential target RS of a mobile station (MS) during a handover, configured to:

receive from a current serving Base Station (BS) of the MS, a dedicated ranging allocation message that comprises public frame information of a public frame that is to be used for allocating dedicated initial ranging transmission opportunity information;

obtaining channel quality indication provided by each potential target RS of the MS; and allocate, in the public frame, the dedicated initial ranging transmission opportunity information to the MS;

wherein the dedicated initial ranging transmission opportunity information is used by the MS to perform ranging to the RS;

wherein the public frame information is based on effective time information about channel parameters in the channel quality indication and comprises one of the group consisting of:

a difference between an ID of the public frame and an ID of a frame when the handover target RS receives the dedicated ranging allocation message; and lower bits of the public frame ID.

16. The relay station according to claim 15, further configured to provide the current serving BS of the MS with channel quality indication; wherein the channel quality indication comprises effective time information about channel parameters which comprises one of the following information:

an ID of a first frame that indicates invalid channel parameters;

lower bits of the ID of the first frame that indicates the invalid channel parameters;

an ID of a last frame that indicates valid channel parameters;

lower bits of the ID of the last frame that indicates the valid channel parameters;

a difference between the ID of the first frame that indicates the invalid channel parameters and an ID of a current frame; and a difference between the ID of the last frame that indicates the valid channel parameters and the ID of the current frame.

17. The relay station according to claim 15, wherein the dedicated ranging allocation message comprises an MS ID or a handover (HO) ID, and destination indication that indicates "allocating".

18. The relay station according to claim 15, further configured to:

receive a handover indication message that the MS rejects the handover or cancels the handover; and cancel allocating, in the public frame, the dedicated initial ranging transmission opportunity information to the MS.

19. A system, comprising a base station (BS) of a mobile station (MS) and a non-transparent relay station (RS) as a potential target RS of the MS, wherein the base station is configured to: determine public frame information of a public frame that is to be used for dedicated initial ranging transmission opportunity information, carry the determined public frame information in a dedicated ranging allocation message, and send the dedicated ranging allocation message;

the non-transparent RS is configured to: receive the dedicated ranging allocation message that comprises the public frame information about the public frame that is to be used for allocating the dedicated initial ranging transmission opportunity information; obtaining channel quality indication provided by each potential target RS of the MS; and allocate the dedicated initial ranging transmission opportunity information in the public frame to the MS;

wherein the dedicated initial ranging transmission opportunity information is used by the MS to perform ranging to the non-transparent RS;

wherein the determined public frame information is based on effective time information about channel parameters in the channel quality indication and comprises one of the group consisting of:

a difference between an ID of the public frame and an ID of a frame when the handover target RS receives the dedicated ranging allocation message; and lower bits of the public frame ID.

20. The system according to claim 19, further comprising a BS of the non-transparent RS when the BS of the MS is different from the BS of the RS, wherein the BS of the RS is configured to receive, the dedicated ranging allocation message that comprises the public frame information about the public frame that is to be used for allocating the dedicated initial ranging transmission opportunity information from the BS of the MS; and send the dedicated ranging allocation message to the non-transparent RS.

21. The system according to claim 19, wherein the dedicated ranging allocation message comprises an MS ID or a handover (HO) ID, and destination indication that indicates "allocating".

22. The system according to claim 19, wherein the RS further configured to: receive a handover indication message that the MS rejects a handover or cancels the handover; and cancel allocating, in the public frame, the dedicated initial ranging transmission opportunity information to the MS.

* * * * *